Figure 1:
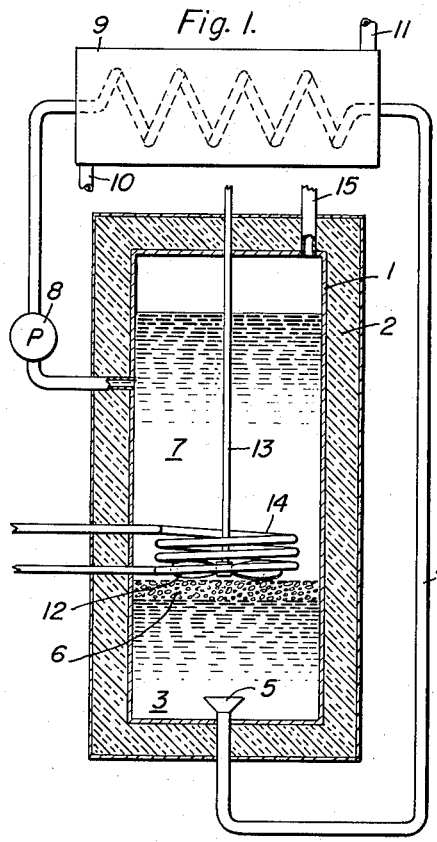

Aug. 22, 1961 R. W. SHADE 2,996,894
METHOD AND APPARATUS FOR THE RECOVERY
OF LATENT HEAT OF FUSION
Filed Dec. 13, 1956

Inventor:
Ray W. Shade,
by Paul G. Frank
His Attorney.

United States Patent Office 2,996,894
Patented Aug. 22, 1961

---

2,996,894
METHOD AND APPARATUS FOR THE RECOVERY OF LATENT HEAT OF FUSION
Ray W. Shade, Ballston Lake, N.Y., assignor to General Electric Company, a corporation of New York
Filed Dec. 13, 1956, Ser. No. 628,134
8 Claims. (Cl. 62—59)

This invention relates to a heat storage system and, in particular, to the recovery of the stored heat, i.e., latent heat of fusion of a given medium, and the transfer of this heat to a fluid by heat exchange methods.

The problem of recovering stored energy has long been a difficult one, and as yet, not fully solved in the most practical and efficient manner. A variety of solutions to this problem has been advanced which generally relates to the utilization of latent heat accompanying a phase change, such as liberation of latent heat of fusion of a liquid when solidifying, for example, water freezing to ice. An apparatus employing this process generally includes a container for the liquid medium undergoing a phase change, and a second liquid passing in heat exchange relationship with or through the container by the use of coils, tubes, and the like heat excange apparatus. One of the disadvantages of such a system is the difficulty of obtaining a high heat transfer coefficient between the stagnant solidifying material and the circulating liquid; therefore, resort is usually made to either very large heat exchange surfaces and/or a choice of liquids having a very high temperature differential between the one in the solid state and the other as the circulating liquid. A further disadvantage of the aforementioned system is that the rate of heat transfer decreases quite rapidly with the formation of ice on the heat exchanger structure, resulting in a low transfer rate with a relatively large amount of liquid remaining whose latent heat of fusion is impracticable to recover.

Accordingly, it is an object of this invention to provide a high coefficient of heat transfer between the fluid components of a heat storage system.

It is another object of this invention to provide for the employment of fluids having a relatively small temperature differential between the one circulating and the other as a solid in a heating and cooling system.

It is a further object of this invention to provide a substantially stable rate of heat transfer between the working components of a heat recovery system in heat exchange relationship.

It is a still further object of this invention to provide a small and efficient heat storage system employing essentially immiscible liquids of different densities and employed as an auxiliary heating system.

Briefly stated, in accordance with one aspect of this invention, heat exchange structure between the liquids of a liquid medium in a heat storage system is substantially eliminated and replaced by a process of intermingling liquids having different densities and essentially immiscible characteristics one with the other, in direct contact. One of the liquids undergoes a change of state and the accompanying liberation of the latent heat of fusion is readily absorbed by the remaining liquid which is employed to provide heat.

Figure 2:
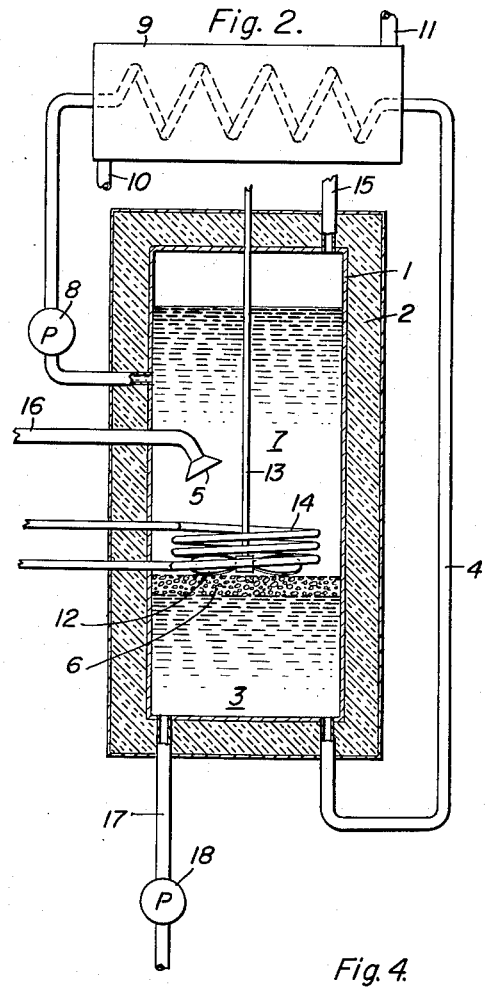

These and various other features and advantages of this invention will be better understood from the following description taken in conjunction with the accompanying drawings, in which:

FIG. 1 is an illustration of one embodiment of a heat storage system;

FIG. 2 discloses a second embodiment of this invention; and

Figure 3:
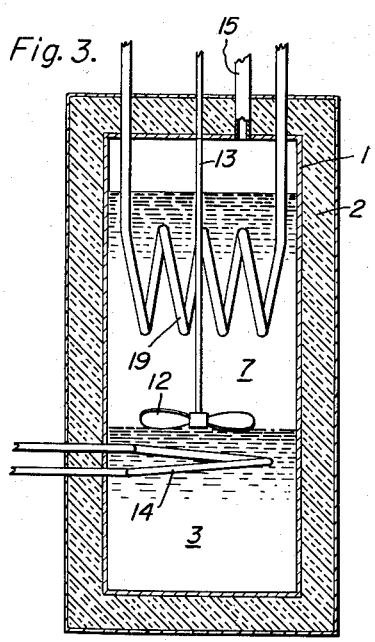

FIG. 3 discloses a non-circulating modification of this invention.

Figure 4:
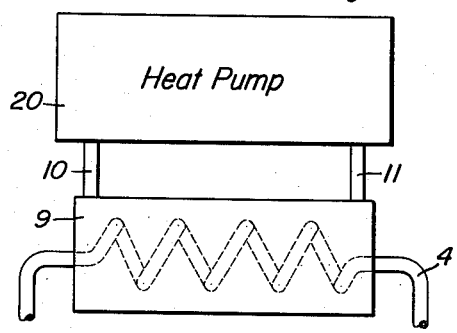

FIG. 4 is a schematic representation of a heat pump or primary heating device which is connected to its evaporator, or the heat exchanger, of FIG. 1.

Referring now to FIG. 1, a container or column 1 is provided in which the mixing of fluids takes place. These fluids are generally chosen from those having different densities and immiscible characteristics, in order that, after mixing, separation may take place rapidly without additional aid from external sources, thus permitting the circulation of one of the fluids without undue entrainment of the other. It is to be understood that many fluids exist which have different densities and immiscibility characteristics; however, for explanatory purposes, a water-oil mixture will be utilized to disclose a working embodiment of this invention. The column 1 which may be insulated, as shown at 2, is partly filled with water 3. Thereafter, oil, at a temperature below the freezing point of water, is introduced below the water surface, as indicated by entrance conduit 4 and spray nozzle 5 to spray the oil into the water 3. The nozzle 5 is designed to give maximum dispersion and turbulence of the oil in the water, and this dispersion of the oil, together with the turbulence generated by the nozzle 5, provides a high rate of heat transfer from the water to the oil, with a resultant cooling of the water and ice particle formation. A high rate of heat transfer is realized from the continuous contact between the water and the oil. The phase change from water to ice liberates latent heat of fusion which is then absorbed by the oil. The small ice particles thus formed settle in a layer 6 at the upper water level in column 1, and the warmed oil 7 rises to above the water and ice layer. The oil, now at an increased temperature, is circulated by means of a pump 8 from the column 1 to heat exchanger 9 where heat is removed from the oil. One of the methods which may be employed to remove the heat from the circulating oil 7 is the use of a circulating fluid entering the heat exchanger 9 at 10 and exiting at 11. The removed heat may then be utilized in various applications, for example, to be applied to the evaporator of the domestic type heat pump 20 (FIG. 4) during periods of extremely cool weather, a process which results in the same reaction in the heat pump 20 as an increase in the ambient air temperature. However, in the latter example the heat pump evaporator may be combined with the heat exchanger 9 and in this instance may be referred to as heat pump evaporator 9. FIG. 4 is then merely an illustration of this latter example where the heat pump 20 is connected to its evaporator by means of inlet 10 and outlet 11 to its evaporator 9. It is thus understood that the latent heat of fusion recovery system becomes an auxiliary heating system or heat source to a primary heating system, i.e., the heat pump, and of course the efficiency of the heat pump is thus greatly increased. The oil leaving the heat exchanger 9, at a reduced temperature, is returned to inlet 4 in column 1 for a repeat of the process heretofore described.

If perhaps additional mixing and turbulence is desired in container 1, any of the well known mixing or agitating devices may be employed in this invention. Such a device may take the form of a mixing impeller 12 connected to a shaft 13 which is arranged to be rotated by an external drive, not shown. However, since additional mixing is but a matter of expedience, it forms no part of this invention.

One of the advantages to be derived from the introduction of oil below the water surface includes the extended time interval of the oil rising through the water for more favorable and increased heat transfer. It should also be evident that the turbulent action prevents or minimizes sub-cooling, and therefore gives a steady rate of heat transfer commencing at approximately 32° F.

The formation of ice particles continues until such time as substantially all the latent heat of fusion of the water has been absorbed and the water becomes a rather dense sludge or ice-water mixture in the bottom of column 1. As an alternative to stopping the operation under these circumstances, heat may be applied to the unit for ice melting or heat supply purposes. Various types of additional heating means may be employed to supply heat in this invention including electrical resistance coils, mechanical heat exchange structure, or heat from ambient conditions. In FIG. 1 there is shown a heat exchanger coil 14 adjacent the ice layer 6. One or more of these coils may be positioned in the water 3, the ice layer 6, or in the oil 7, the particular location being a function of the anticipated operation.

Unit operation may also be of the intermittent variety wherein only part of the water is frozen and, in the case of heat pump evaporator application, no further heat is necessary. During these periods of inactivity heat may be obtained from the heat pump, when an excess is available, to be supplied to the unit for ice melting, thus assuring a full supply of heat (or water) for the succeeding operating period. It is, of course, obvious that the system is reversible in the following sense. Assume that container 1 is in the condition as illustrated in FIG. 1 where ice is present. Under these conditions the heat pump evaporator 9 is to be cooled instead of heated as previously described. Pump 8 is operated to pump oil through the evaporator to take up heat. The warmed oil is then introduced through nozzle 5 and melts the ice in the water 3. Melting of the ice provides transfer of latent heat of fusion from the melting ice to the oil.

In order to conserve heat, many refinements may be incorporated in this invention. Specifically, the pump and drive may be of the submerged type, and the heat of operation absorbed by the oil or water. Further, a part of the container 1 may be mounted in heat exchange relationship with other heat generating devices in the domestic type heat pump or other such device to which this invention may be applied.

FIG. 1 which illustrates one preferred embodiment of this invention, may be modified without departing from the scope of this invention, to an alternate operation wherein the water may be sprayed into the oil for particle freezing therein and a settling out. The choice of the spraying medium, however, will be largely determined by the operating factors, particularly the specific application of this invention.

A water spray system of the type described is illustrated in FIG. 2 wherein water from any suitable source, such as a domestic home supply, is introduced into oil 7 through conduit 16 and spray nozzle 5. The freezing ice particles release latent heat of fusion to the oil and settle to the ice layer 6 at the water-oil boundary. Water, and in some cases a water and ice mixture, is removed from the container 1 through conduit 17 by a pump 18, which is capable of pumping, if necessary, a sludge of ice and water.

The water spray method presents a dual configuration. In one, the closed system, the withdrawn water may be recirculated into the container 1 with the unit reaching a shut-down point when substantially all the water is frozen and no external heat is supplied. In the other configuration, the open system, water may be, as necessary, continuously supplied to the container 1 and the resulting sludge continually pumped to a suitable disposal, such as a sewer system, and the like.

This latter configuration entails some small loss of oil over a period of time and necessitates the addition of a small quantity of make-up oil when needed. On the other hand, the system not only eliminates the requirement of equipment and energy for the melting of the ice, but also may eliminate or reduce the capacity requirement of the pump to pump water into column 1.

A modified form of this invention may eliminate circulating the oil exteriorly of the container 1. Referring now to FIG. 3 there is shown the container 1 with oil 7 and water 3 therein in separate layers. A heat exchanger coil 19 is positioned within the oil layer to circulate a fluid of a lower temperature than the freezing point of the water. This process cools the oil surrounding the heat exchanger and produces some circulation of the oil near the water-oil division. In so circulating, the cold oil 7 is brought in contact with the water 3 which freezes and gives up latent heat of fusion to the oil, which is turn transfers heat to the circulating fluid in the heat exchanger coil 19.

Heat exchanger coil 19 is preferably mounted in the oil to prevent ice formation thereon and the resultant reduction in rate of heat exchange. Additionally, it may be desirable to provide means for generating turbulence to prevent ice formation in a relatively large body, and for such purpose various devices may be employed including the impeller agitator 12 as illustrated in FIGS. 1 and 2. Furthermore, heat may be added to the container 1 by heat exchanger coil 19, or other heating arrangements as described for FIGS. 1 and 2.

This invention as described relates to the recovery of latent heat of fusion and utilizes a water-oil mixture for explanatory purposes. It is to be understood, however, that this invention may utilize various combinations of liquids including also solutions of certain materials, for example, disodium phosphate with liquids which will solidify at predetermined temperatures to liberate latent heat of fusion. This liberation of latent heat of fusion may be carried on at atmospheric pressure by venting the container 1 as at 15 or, alternatively, the process may be carried out at pressures below as well as above atmospheric.

While other modifications of this invention and variations of apparatus which may be employed within the scope of this invention have not been described, the invention is intended to include all such as may be embraced within the following claims.

What I claim as new and desire to secure by Letters Patent of the United States is:

1. In a closed cycle latent heat recovery system employing a container having therein a liquid medium, said liquid medium comprising a solution of disodium phosphate and water which will precipitate solid disodium phosphate at a predetermined temperature, the method which comprises, introducing into said solution a liquid at a temperature below the solidifying temperature of the disodium phosphate to cause solidification thereof and a concurrent release of latent heat of fusion to said liquid, maintaining the said liquid and the said solution in separate layers in said container, circulating the said liquid from its respective layer in said container to a heat exchanger for a withdrawal of heat therefrom, utilizing the heat obtained from said heat exchanger, returning said liquid to the said solution, and adding heat to said solution in said container to dissolve the solid disodium phosphate.

2. The invention as claimed in claim 1 wherein said introduced liquid is oil.

3. The invention as claimed in claim 1 wherein said introduced liquid is water.

4. An apparatus utilizing latent heat of fusion which comprises in combination, a primary heating device having a heat exchanger operatively connected thereto to increase the efficiency thereof, and auxiliary heating means to add heat to said heat exchanger, said heating means comprising a container operatively connected to said heat exchanger, said container containing a liquid medium therein, said liquid medium having a component of a higher solidification temperature than the remainder of said medium, means circulating the remainder to said heat exchanger for cooling of the remainder below the solidification temperature of said component, means intermingling said cooled remainder in said component in heat exchange relationship to cause particle solidification of said component and a concurrent release of latent heat of fusion to said remainder, said recirculating means recirculating said remainder through said heat exchanger to provide heat thereto prior to a recontacting with said component, and means to melt said particles in said container.

5. The invention as claimed in claim 4 wherein said heating device is a heat pump and said heat exchanger is the evaporator for said heat pump.

6. The invention as claimed in claim 4 wherein said liquid medium comprises a pair of liquids having different densities and emissibility characteristics.

7. An apparatus utilizing latent heat of fusion which comprises in combination, a heat pump including an evaporator operatively connected thereto, and a closed cycle system to supply heat to and remove heat from said evaporator, said system comprising a container operatively connected to said evaporator, said container having liquid medium therein, said liquid medium having a component which will solidify a higher temperature than the remainder of said medium, means circulating said remainder to said evaporator to cool said remainder below the solidification temperature of said component, means introducing the said cooled remainder directly into said component in heat exchange relationship to cause particle solidification of said component and a concurrent release of latent heat of fusion to said remainder, said circulating means recirculating said remainder to said evaporator for withdrawal of heat from said remainder for return of said remainder to said component, and means to melt said particles in said container.

8. A method of utilizing latent heat of fusion as an auxiliary heating system to supply heat to a primary heating apparatus having a heat exchanger to increase the efficiency of said primary heating apparatus comprising, utilizing a closed cycle latent heat of fusion recovery system with said heat exchanger which includes, employing in said closed cycle latent heat recovery system a liquid medium characterized by having a component which will solidify at a higher temperature than the remainder of said medium, circulating the said remainder of said liquid medium through said heat exchanger for release of heat therein, intermingling the said cooled remainder with said component to cause particle solidification of said component and concurrent release of latent heat of fusion to said remainder, and circulating said remainder through said heat exchanger for release of latent heat therein, and providing means to melt said particles in said container.

References Cited in the file of this patent

UNITED STATES PATENTS

| | | |
|---|---|---|
| 523,412 | Scheffler | July 24, 1894 |
| 1,969,187 | Schutt | Aug. 7, 1934 |
| 2,507,632 | Hickman | May 16, 1950 |
| 2,613,513 | Shields | Oct. 14, 1952 |
| 2,631,835 | Jones | Mar. 17, 1953 |
| 2,666,304 | Ahrel | Jan. 19, 1954 |
| 2,764,488 | Slattery | Sept. 25, 1956 |
| 2,778,607 | Leoni | Jan. 22, 1957 |
| 2,886,603 | Shelton | May 12, 1959 |

FOREIGN PATENTS

| | | |
|---|---|---|
| 537,450 | France | May 23, 1922 |

UNITED STATES PATENT OFFICE

CERTIFICATE OF CORRECTION

Patent No. 2,996,894

August 22, 1961

Ray W. Shade

It is hereby certified that error appears in the above numbered patent requiring correction and that the said Letters Patent should read as corrected below.

Column 3, line 35, for "from the melting ice to the oil" read -- from the oil to the melting ice --.

Signed and sealed this 12th day of June 1962.

(SEAL)
Attest:

ERNEST W. SWIDER
Attesting Officer

DAVID L. LADD
Commissioner of Patents